(12) United States Patent
Pagels

(10) Patent No.: US 8,626,473 B2
(45) Date of Patent: Jan. 7, 2014

(54) REAL-TIME TRANSMISSION OF SURVEY DATA

(75) Inventor: Christian Michael Pagels, Grasbrunn (DE)

(73) Assignee: Trimble Navigation Limited, Sunnyvale, CA (US)

( * ) Notice: Subject to any disclaimer, the term of this patent is extended or adjusted under 35 U.S.C. 154(b) by 1019 days.

(21) Appl. No.: 12/221,872

(22) Filed: Aug. 7, 2008

(65) Prior Publication Data

US 2010/0036642 A1 Feb. 11, 2010

(51) Int. Cl.
*G06F 3/05* (2006.01)
*G06F 3/00* (2006.01)
*G06F 3/01* (2006.01)
*G06F 3/06* (2006.01)

(52) U.S. Cl.
USPC ............ 702/188; 702/178; 702/182; 702/189

(58) Field of Classification Search
USPC .......... 702/188, 141, 178, 182, 189; 434/362; 455/456.1; 482/8; 707/609
See application file for complete search history.

(56) References Cited

U.S. PATENT DOCUMENTS

| | | | |
|---|---|---|---|
| 5,757,646 A | 5/1998 | Talbot et al. | |
| 6,226,601 B1 * | 5/2001 | Longaker | 702/79 |
| 6,324,473 B1 * | 11/2001 | Eschenbach | 701/470 |
| 6,327,533 B1 * | 12/2001 | Chou | 701/207 |
| 6,487,499 B1 * | 11/2002 | Fuchs et al. | 701/478 |
| 6,490,524 B1 * | 12/2002 | White et al. | 701/215 |
| 6,529,830 B1 | 3/2003 | Eschenbach | |
| 6,727,849 B1 * | 4/2004 | Kirk et al. | 342/357.52 |
| 7,020,701 B1 * | 3/2006 | Gelvin et al. | 709/224 |
| 7,217,224 B2 * | 5/2007 | Thomas | 482/8 |
| 7,480,511 B2 * | 1/2009 | O'Meagher | 455/456.1 |
| 2002/0169558 A1 * | 11/2002 | Smith et al. | 702/5 |
| 2003/0187979 A1 * | 10/2003 | Hekstra et al. | 709/224 |
| 2004/0022227 A1 * | 2/2004 | Lynch et al. | 370/338 |
| 2004/0145516 A1 * | 7/2004 | Large et al. | 342/357.02 |
| 2006/0264221 A1 * | 11/2006 | Koike et al. | 455/456.1 |
| 2007/0219722 A1 * | 9/2007 | Sawyer et al. | 702/1 |
| 2007/0239999 A1 * | 10/2007 | Honig et al. | 713/194 |
| 2008/0120122 A1 * | 5/2008 | Olenski et al. | 705/1 |
| 2010/0070179 A1 | 3/2010 | Cameron | |
| 2010/0070465 A1 * | 3/2010 | Zeibak | 707/609 |
| 2010/0233667 A1 * | 9/2010 | Wilson et al. | 434/362 |

* cited by examiner

*Primary Examiner* — Marc Armand
*Assistant Examiner* — Felix Suarez

(57) ABSTRACT

In a survey operation, survey measurement data obtained at each location is transmitted in real time as the measurement is made to avoid the limitations of the disk or other storage medium used in saving the data, to avoid loss or corruption of the data prior to the disk being delivered to its final destination, and to allow users to immediately view the results of the measurements while the rovers are still out in the field and readily capable of redoing measurements or supplementing the results with additional measurement points.

15 Claims, 1 Drawing Sheet

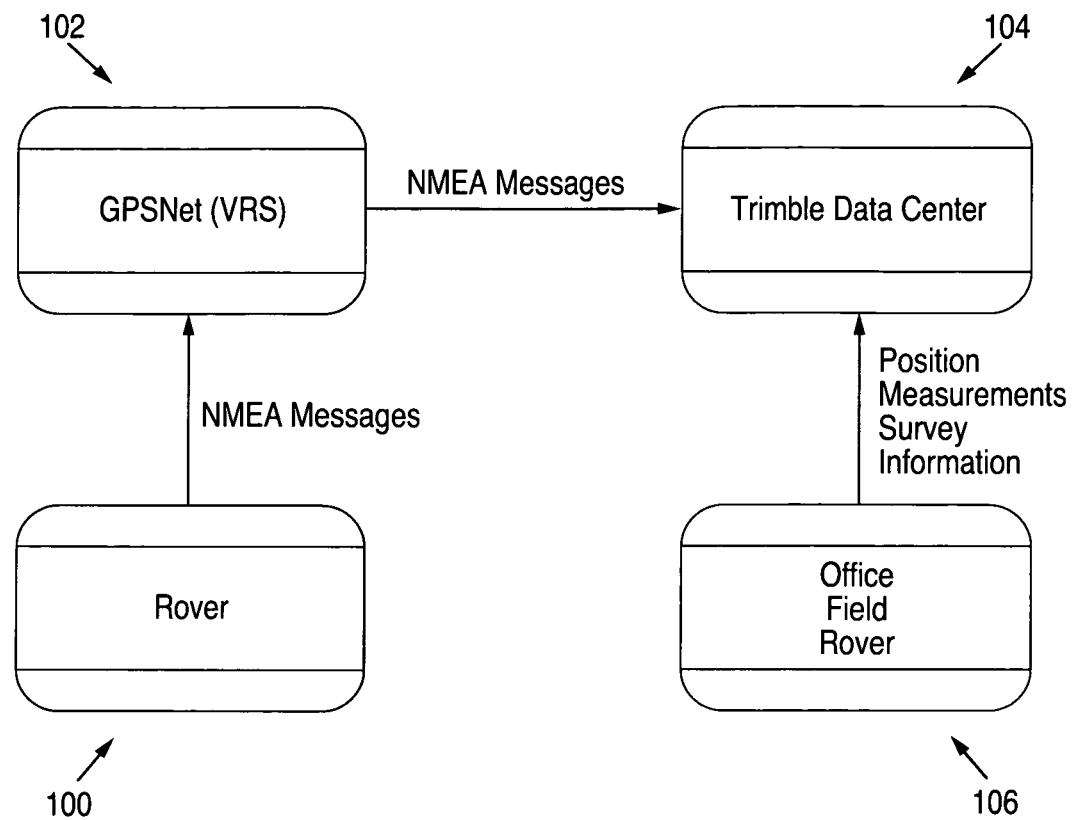

REAL-TIME TRANSMISSION OF SURVEY DATA

FIELD OF THE INVENTION

The invention relates to surveying. In particular it relates to the dissemination of survey data.

BACKGROUND OF THE INVENTION

It is common to perform surveys by making use of one or more mobile or rover units that collect survey data at selected points. These measurements can be made using conventional (optical) surveying equipment or by making use of GPS or other satellite based augmentation system (SBAS) receivers.

As is discussed in greater detail below, in the case of SBAS, improved accuracy is achieved by making use of the relative timing of signals transmitted from a number of satellites visible to the receiver and processing the results using a technique referred to as Real Time Kinematics (RTK) to obtain highly accurate position fixes.

The Global Positioning System (GPS) is a system of satellite signal transmitters that transmit information from which an observer's present location and/or the time of observation can be determined. GPS is however not the only satellite-based navigation system. Another commonly used SBAS system is the Global Orbiting Navigational System (GLONASS), which can operate as an alternative or supplemental system to GPS.

For ease of terminology the present application will refer to a Satellite Based Augmentation System or SBAS, to refer to a GPS or GLONASS, and to any other compatible satellite-based system that provides information by which an observer's position and the time of observation can be determined.

In particular, a Satellite Based Augmentation System (SBAS) uses the transmission of coded radio signals from a family of earth-orbiting satellites (24 satellites for GPS) to calculate a receiver's position. An SBAS antenna receives SBAS signals from a plurality (preferably four or more) SBAS satellites and passes these signals to an SBAS signal receiver/processor, which identifies the SBAS satellite source for each SBAS signal, determines the time at which each identified SBAS signal arrives at the antenna, and determines the present location of the SBAS satellites, from which the receiver's location is calculated.

Differential Global Positioning System (DGPS), in turn, is a technique that significantly improves both the accuracy and the integrity of the Global Positioning System (GPS). The most common version of DGPS requires high-quality GPS "reference receivers" at known, surveyed locations. The reference station estimates the slowly varying error components of each satellite range measurement and forms a correction for each GPS satellite in view. This correction is broadcast to all DGPS users on a convenient communication link. Typical ranges for a local area differential GPS (LADGPS) station are up to 150 km and expected accuracies with DGPS are within the range from 1 to 5 meters.

Most DGPS systems use a single reference station to develop a scalar correction to the code-phase measurement. However, in what is known as wide area DGPS, or WADGPS a network of reference stations can be used instead to form a vector correction for each satellite. This vector consists of individual corrections for the satellite clock, three components of satellite positioning error (or ephemeris), and parameters of an ionospheric delay model. The validity of this correction still decreases with increased latency or age of the correction. However, compared to a scalar correction, a vector correction is valid over much greater geographical areas.

Users with very stringent accuracy requirements may further improve accuracy by making use of a technique called carrier-phase DGPS or CDPGS. These users measure the phase of the GPS carrier relative to the carrier phase at a reference site, thus achieving range measurement precision that is a few percent of the carrier wavelength, typically about one centimeter. These GPS phase comparisons are used in survey applications, where the antennas are separated by tens of kilometers. If the antennas are moving, the position fix is said to be kinematic, and is also referred to as Real Time Kinematic or RTK. Typically the position is transmitted using the National Marine Electronics Association (NMEA) protocol, wherein the kinematic information is transmitted in a GGA record in the NMEA protocol frame, for instance every 10 seconds.

Thus currently in a survey operation making use of RTK, as a rover traverses the terrain, its position, bearing, attitude and other attributes about the rover movement can be constantly monitored, and the coordinates transmitted to a central location, typically according to a standard data format protocol as defined by the NMEA (National Marine Electronics Association).

Rovers are typically connected to a server by means of a bidirectional communications link in order to allow rover units to transmit their current positions as NMEA messages to the server. GPS correction data is in turn transmitted to the various rovers and the corrected positional information sent back to the server. This typically takes place on the same line that a rover receives the reference correction stream on and is usually implemented by a radio link. In a Virtual Reference Station (VRS) environment the NMEA communications that transmit the positional information of the rovers take place between the rover units and a VRS server.

In the course of a survey operation, a rover makes survey measurements at selected locations as part of a project and stores these in a local memory, usually on a memory disk. This information is subsequently made available as a job file once the rover returns to a central station with the disk.

SUMMARY OF THE INVENTION

According to the invention, there is provided a method surveying, comprising obtaining survey measurement data and transmitting the survey measurement data to a central location in real time. For purposes of this invention the term "real time" will include transmitting survey measurement data for a first location before obtaining survey measurement data for a second location. The term "real time" also includes storing survey measurement data for one or more locations in a memory for subsequent transmission while obtaining survey measurement data for additional locations. Typically the survey measurement data for each location is transmitted to the central location in the order in which it is obtained. Typically the survey measurement data is transmitted to a VRS server. The transmission from the rover to the server may be as an NMEA or other suitable message. The VRS server may forward the NMEA messages to a central location, such as a Data Center which may decode the messages and store them in a Structured Query Language (SQL) database (DB), where it may be gathered and organized, e.g., by user/rover, project, and session. The transmission from the VRS server to the central location may also be as an NMEA message or using any other suitable format. The survey measurement data may be transmitted as part of an NMEA message by adding a measurement results (MRES) record to an NMEA message frame. Preferably the survey measurement data includes all required information to represent the full measurement results of a survey. The method may include making the survey measurement data available for downloading over the Internet to facilitate any authorized client to download measurement result information. The method therefore includes making the survey measurement data available on a secure data link e.g, by providing password protection.

The method may also include displaying the survey measurement data on a map. A map may include a representation of the geographic area being surveyed (also referred to as a terrain map) or an aerial photograph of the area being surveyed. One example of a map on which the survey measurement data may be represented is an aerial photograph as provided by Google Maps.

The method may include re-measuring locations of previously obtained survey measurement data or supplementing the survey measurement data by adding additional survey measurement data locations before the rover returns from a survey session.

The present invention has the benefit that since the measurement workflow is transmitted as it becomes available or once the communications link to the VRS server allows the transmission there is no need to wait for the end of a survey to use the data. As soon as the first data is at the database and is made available for downloading it can be used by any authorized user.

BRIEF DESCRIPTION OF THE DRAWINGS

FIG. 1 shows a block diagram of one embodiment of the invention.

DETAILED DESCRIPTION OF THE INVENTION

In one embodiment of the invention, as depicted by FIG. 1, survey information (also referred to herein as survey measurement data) is sent from a rover unit 100 to a VRS (Virtual Reference Station) server 102, using the NMEA standard. The kinematic location information is preferably sent in a manner known in the art, as a GGA record in the NMEA frame, and may be sent at regular intervals, e.g., every 10 seconds. The survey information, is in turn transmitted in this embodiment by adding one or more records, e.g., a MRES record to the NMEA frame whenever a point measurement is made. Depending on the data that is to be transmitted with each measurement, one or more additional records may have to be included in the NMEA frame. The NMEA message, in accordance with this embodiment of the invention, will thus contain the results of a point measurement. The VRS server 102 sends the NMEA message as it arrives to a central location or data center, which in the present example will be referred to as the Trimble Data Center 104.

The Trimble Data Center 104 decodes the messages and sends them for storage to an SQL DB. Thus, each time a survey measurement is made the NMEA message includes all required information to represent the full measurement results of a survey point as is discussed in greater detail below. All survey measurement data in this embodiment is organized by user/rover, project and session in the SQL DB. An SQL server provides a user interface to access and make use of the data. This allows any authorized client such as the rovers performing the survey operation (depicted by reference numeral 106) to connect on a secured data link and download the required information. Thus, the rovers performing a survey operation could continually view their results and corresponding positions even prior to returning to their point of beginning (POB) or even if there is no return to the POB.

In the present embodiment the SQL server is implemented as an Internet server and the information is password protected.

Since, in accordance with the invention the survey data for each point is transmitted once the measurement is made without first locally gathering the information for all the survey points, the present invention avoids the need to wait for the end of a survey to use the data. As soon as the first data is on the DB it can be used by authorized users.

Thus the present invention has the benefit that the rover transmits all required information in independent messages to a server allowing all job information to be rebuilt. This avoids the prior art problem of loss of information between the time the data is gathered and the time that the rover submits the information to a batch file in the form of a disk. Also, since the information is immediately available from the server it allows the locations of the rovers and the survey measurement results to be monitored as the survey measurement information is obtained by the rovers. This allows measurements to be redone or additional measurements made if needed, while the rover units are still out in the field.

In one embodiment of the invention the locations or points of the survey measurement data is superimposed onto a Google Map for ease of visualization. It will be appreciated that the Google Map could be replaced by any aerial photograph, terrain map or other geographic representation of the area where the survey operation is taking place.

In one embodiment the position and the measurement results are thus available in real-time and visually represented on an aerial photograph of the region to provide the following information:
  Project information (name, purpose . . . )
  User information (name, company . . . )
  Reference information (receiver, antenna . . . )
  Rover hardware information (receiver, antenna, firmware . . . )
  Station setup (system to measure in . . . )
  Reference position information (coordinates . . . )
  Measurement results (point id, vector to reference, covariance matrix, feature code, observation statistics . . . )

In order to provide the full range of information set out in the embodiment above using an NMEA message frame, several additional records will typically have to be included. For instance, the project information can be transmitted as a GPUID message in a separate frame, while the reference position coordinates can be transmitted as part of yet another frame.

In one embodiment the following message was included in the NMEA frame

| \multicolumn{3}{c}{MRES message} | | |
|---|---|---|
| Sect | Field | Description |
| 0, 1 | $PTNL,MRES | |
| 02 | wwww, | week of measurement (int) |
| 03 | sssss.sss, | seconds of week of measurement (double) |
| 04 | refId | station id of reference station (string) empty for now |
| 05 | refX | x coordinate of reference station (double) WGS84 |
| 06 | refY | y coordinate of reference station (double) coordinate system to be defined |
| 07 | refZ | z coordinate of reference station (double) coordinate system to be defined |

-continued

MRES message

| Sect | Field | Description |
|---|---|---|
| 08 | refAnt | antenna type of reference station (int) set to 255 if unknown |
| 09 | refh | antenna height of reference station (double) measured to ARP |
| 10 | stationId | station id of measured point (string) might be empty |
| 11 | dX | x coordinate of measured vector (double) |
| 12 | dY | y coordinate of measured vector (double) |
| 13 | dZ | z coordinate of measured vector (double) |
| 14 | stationAnt | antenna typo of measurement (int) set to 255 if unknown |
| 15 | stationh | antenna height (double) measured to ARP |
| 16 | Covxx | covariance matrix element for xx (double) |
| 17 | Covxy | covariance matrix element for xy (double) |
| 18 | Covyy | covariance matrix element for yy (double) |
| 19 | Covxz | covariance matrix element for xz (double) |
| 20 | Covyz | covariance matrix element for yz (double) |
| 21 | Covzz | covariance matrix element for zz (double) |
| 22 | nSat | number of satellites (int) might be empty |
| 23 | nStatEp | number of static epochs (int) |
| 24 | pdop | pdop of measurement (double) |
|  | *hh | Checksum |
|  | <CR><LF> | Terminator |

While in the present embodiment the survey measurement data is transmitted immediately upon making the measurement, in another embodiment a storage medium is provided at the rover to allow the survey measurement data to be stored in memory for subsequent transmission to the VRS server. This would provide a suitable solution for situations where terrain, weather or other conditions prevent the transmission of the data to the VRS server immediately. The data would then be stored in the memory until such time that a transmission of the data can be made, which could be prior to, during, or after any one of the subsequent measurements is made. This would allow a rover to continue to collect survey measurement data pending the transmission of previously collected and stored survey measurement data.

In the above embodiment, reference was made specifically to a GPS based survey, however the invention is not so limited. In fact, in another embodiment survey results obtained using an optical Totalstation (as provided by the present applicant) were transmitted in real time to a server using a modem and Wide Area Network (WAN) arrangement. In yet another embodiment the survey results from a laser scanner were captured in real time by transmitting the survey information to a server in accordance with the invention.

While the present invention has been described with respect to a few specific embodiments it will be appreciated that the invention can be implemented in other ways without departing from the scope of the invention as defined by the claims.

What is claimed is:

1. A method of surveying, comprising:
    obtaining a first instance of survey measurement data for a first location by a rover unit;
    transmitting by said rover unit said first instance of survey measurement data to a Virtual Reference Station (VRS) server in real time;
    upon arrival of said first instance of survey measurement data at said VRS server, transmitting by said VRS server said first instance of survey measurement data to a central location;
    storing said first instance of survey measurement data in a Structured Query Language (SQL) database of said central location; and
    making said first instance of survey measurement data for said first location available for downloading from said central location over the Internet.

2. A method of claim 1, wherein the real time transmission comprises transmitting said first instance of survey measurement data for said first location before obtaining a second instance of survey measurement data for a second location.

3. A method of claim 2, wherein the real time transmission comprises storing said first instance of survey measurement data for said first instance of survey measurement data for said first location and in a memory, and subsequently transmitting said first instance of survey measurement data for said first location while continuing to obtain said second instance of survey measurement data for said second location.

4. A method of claim 3, wherein the survey measurement data for said first instance of survey measurement data for said first location and said second instance of survey measurement data for said second location is transmitted to the central location in the order in which it is obtained.

5. A method of claim 1, wherein the transmission from said rover to said VRS server of said first instance of survey measurement data for said first location is by way of National Marine Electronics Association (NMEA) messages.

6. A method of claim 1, wherein said first instance of survey measurement data for said first location is gathered and organized in said SQL database by user/rover, project, and session.

7. A method of claim 1, wherein the transmission from said VRS server to said central location is as part of one or more NMEA messages.

8. A method of claim 7, wherein said first instance of survey measurement data for said first location is transmitted as part of an NMEA message by adding a measurement results (MRES) record to an NMEA message frame.

9. A method of claim 1, wherein said first instance of survey measurement data for said first location is made available on a secure data link.

10. A method of claim 9, wherein the secure data link includes password protection.

11. A method of claim 1, further comprising displaying said first instance of survey measurement data for said first location on a geographic representation.

12. A method of claim 11, wherein said geographic representation comprises a terrain map of the geographic area being surveyed.

13. A method of claim 1, further comprising re-measuring locations of previously obtained survey measurement data by adding additional survey measurement data locations before the rover returns from a survey session.

14. A method of claim 12, further comprising supplementing the survey measurement data by adding additional survey measurement data locations before the rover returns from a survey session.

15. The method of claim 11 wherein said geographic representation comprises an aerial photograph of the area being surveyed.

* * * * *